United States Patent
Hatscher et al.

(10) Patent No.: US 9,343,767 B2
(45) Date of Patent: May 17, 2016

(54) CATALYST FOR LOW-TEMPERATURE CONVERSION AND PROCESS FOR THE LOW-TEMPERATURE CONVERSION OF CARBON MONOXIDE AND WATER INTO CARBON DIOXIDE AND HYDROGEN

(75) Inventors: Stephan Hatscher, Syke (DE); Michael Hesse, Worms (DE); Markus Hoelzle, The Woodlands, TX (US)

(73) Assignee: BASF SE, Ludwigshafen (DE)

( * ) Notice: Subject to any disclaimer, the term of this patent is extended or adjusted under 35 U.S.C. 154(b) by 810 days.

(21) Appl. No.: 12/373,057

(22) PCT Filed: Jul. 19, 2007

(86) PCT No.: PCT/EP2007/057450
§ 371 (c)(1),
(2), (4) Date: Jan. 9, 2009

(87) PCT Pub. No.: WO2008/012255
PCT Pub. Date: Jan. 31, 2008

(65) Prior Publication Data
US 2010/0012895 A1    Jan. 21, 2010

(30) Foreign Application Priority Data
Jul. 26, 2006  (EP) ..................................... 06117843

(51) Int. Cl.
| | | |
|---|---|---|
| *B01J 21/00* | (2006.01) | |
| *B01J 23/00* | (2006.01) | |
| *B01J 23/02* | (2006.01) | |
| *B01J 23/06* | (2006.01) | |
| *B01J 25/00* | (2006.01) | |
| *B01J 29/00* | (2006.01) | |
| *H01M 8/06* | (2016.01) | |
| *B01J 23/80* | (2006.01) | |
| *B01J 37/03* | (2006.01) | |
| *C01B 3/16* | (2006.01) | |
| *B01J 21/06* | (2006.01) | |
| *B01J 37/00* | (2006.01) | |
| *H01M 8/10* | (2016.01) | |

(52) U.S. Cl.
CPC .............. *H01M 8/0668* (2013.01); *B01J 23/80* (2013.01); *B01J 37/03* (2013.01); *C01B 3/16* (2013.01); *B01J 21/066* (2013.01); *B01J 23/007* (2013.01); *B01J 37/0009* (2013.01); *C01B 2203/1076* (2013.01); *C01B 2203/1082* (2013.01); *H01M 2008/1095* (2013.01); *Y02E 60/50* (2013.01)

(58) Field of Classification Search
USPC ......... 502/341–343, 345–346, 349, 100, 300, 502/340
See application file for complete search history.

(56) References Cited

U.S. PATENT DOCUMENTS

| | | | | |
|---|---|---|---|---|
| 5,272,017 A | * | 12/1993 | Swathirajan | C25B 9/10 429/309 |
| 6,627,572 B1 | * | 9/2003 | Cai | B01J 23/80 502/307 |
| 6,689,713 B1 | * | 2/2004 | Zhao | B01J 23/72 502/345 |
| 6,693,057 B1 | * | 2/2004 | Cai | B01J 23/80 502/342 |
| 7,064,097 B1 | * | 6/2006 | Cai | B01J 23/80 502/342 |

FOREIGN PATENT DOCUMENTS

| | | | |
|---|---|---|---|
| WO | 02 26619 | 4/2002 | |
| WO | 03 082468 | 10/2003 | |
| WO | WO 03082468 A1 * | 10/2003 | ............... B01J 23/80 |

OTHER PUBLICATIONS

Velu S., et al., "Selective production of hydrogen for fuel cells via oxidative steam reforming of methanol over CuZnAl(Zr)-oxide catalysts", Applied Catalysis A: General vol. 213, No. 1, pp. 47-63, XP004234459, 2001.
Barbier J. Jr., et al., "Steam effects in three-way catalysis", Applied Catalysis B: Elsevier, Environmental vol. 4, pp. 105-140, 1994.
Twigg M. V., "Catalyst Handbook Second Edition", Wolfe Publishing Ltd., pp. 314-320 and 330-331, 1989.
Ruettinger W., et al., "A new generation of water gas shift catalysts for fuel cell applications", Journal of Power Sources, vol. 118, pp. 61-65, 2003.
Velu S., et al., "Oxidative steam reforming of methanol over CuZnAl(Zr)-oxide catalysts; a new and efficient method for the production of Co-free hydrogen for fuel cells", The Royal society of Chemistry, pp. 2341-2342, 1999. (with English Translation).
Trifiro F., et al., "Preparation and properties of copper synthetic anionic clays", Elsevier Science Publishers B.V., pp. 571-580, 1988.
Adapting to technical progress for the seventeenth time Council Directive 67/548/EEC on the approximation of laws, regulations and administrative provisions relating to the classification, packaging and labeling of dangerous substances, Commission Directive 92/69/EEC of Jul. 31, 1992, with Appendix A13.

* cited by examiner

*Primary Examiner* — James McDonough
(74) *Attorney, Agent, or Firm* — Oblon, McClelland, Maier & Neustadt, L.L.P.

(57) ABSTRACT

Chromium-free catalyst for the low-temperature conversion of carbon monoxide and water into hydrogen and carbon dioxide, which comprises a mixed oxide comprising at least copper oxide, zinc oxide and aluminum oxide, with the catalyst precursor being present essentially as hydrotalcite and the copper oxide content being not more than 20% by weight.

15 Claims, 3 Drawing Sheets

8%CuO+72%ZnO+17.5%Al$_2$O$_2$+2.5%ZrO$_2$

CATALYST FOR LOW-TEMPERATURE CONVERSION AND PROCESS FOR THE LOW-TEMPERATURE CONVERSION OF CARBON MONOXIDE AND WATER INTO CARBON DIOXIDE AND HYDROGEN

The invention relates to a catalytic composition and a process for the low-temperature conversion of carbon monoxide (CO) and water ($H_2O$) into carbon dioxide ($CO_2$) and hydrogen ($H_2$), in particular for use in fuel cell systems. The invention further relates to a process for producing such a catalyst. The catalyst is a chromium-free, nonpyrophoric catalyst for the water gas shift reaction which is based on a hydrotalcite phase as precursor.

The process for preparing hydrogen by means of the conversion reaction (also: shift reaction) of $H_2O$ and CO to form $H_2$ and $CO_2$ in a fluid medium, in particular for preparing hydrogen in a gas stream which comprises mainly hydrogen, water and carbon monoxide serves, in particular, to generate high-purity hydrogen for fuel cell applications, especially for use in fuel cells which are based on proton exchange membranes (PEMs).

Fuel cells convert chemical energy directly into electric energy and thus avoid mechanical processes. They are proposed as energy source for various applications. A fuel cell can operate from two to three times as effectively as internal combustion engines known hitherto and displays very low emissions of pollutants such as carbon monoxide (CO), nitrogen oxides ($NO_x$) or hydrocarbons.

Fuel cells, including PEM fuel cells (also known as SPE, solid polymer electrolyte, fuel cells), generate electric energy by means of a reaction between hydrogen as reducing agent and oxygen as oxidant, which are both introduced into the cell. In the case of a PEM fuel cell, an anode and cathode are separated from one another by a membrane which is normally made up of an ion exchange resin. The material used for an anode and cathode is usually a fine mixture of ion exchange resin and carbon particles, intimately mixed with catalyst particles. In typical operation of such a cell, hydrogen gas is oxidized electrolytically to protons at an anode comprising platinum on conductive carbon black. The protons pass through the membrane which may be a fluorosulfonic acid polymer. Water ($H_2O$) is produced when the protons come into contact with the oxygen which has been electrolytically reduced at the cathode. The electrons flow through an external circuit of this process and provide the power. Examples of constructions of membranes and electrodes may be found in U.S. Pat. No. 5,272,017.

Fuel cells require both an oxygen source and a hydrogen source in order to function. The oxygen can be obtained simply in pure form (as $O_2$) from the air. However, hydrogen is not present in sufficient quantity in the air in order to operate fuel cells using it.

The low energy density (per unit volume) of isolated hydrogen gas compared to conventional hydrocarbons makes direct supply of fuel cells with hydrogen unfavorable for most applications, since a very large volume of hydrogen gas is needed in order to obtain the same energy which is comprised in a very much smaller volume of conventional hydrocarbons such as natural gas, alcohol or oil. The conversion of the abovementioned hydrocarbon-based fuels into hydrogen gas is therefore an attractive source of hydrogen for fuel cell applications.

The removal of impurities such as sulfur from the starting materials and a reduction in the concentration of oxidation products which are formed during the conversion process, for example carbon monoxide, are the challenges in hydrogen production. Fuel cells are quickly put out of action by small concentrations of CO, since CO poisons the catalyst on the anode. Despite the development of ever more CO-resistant Pt/Ru anodes, fuel cells continue to require a hydrogen source which supplies hydrogen having a CO concentration below 50 ppm.

Present-day industrial methods of producing high-purity $H_2$ (i.e. hydrogen which comprises concentrations of sulfur components and CO which are sufficiently low for fuel cells) cannot be employed for fuel cell applications. The production of hydrogen gas from naturally occurring hydrocarbons is widespread in the chemical industry, for example for preparing ammonia from nitrogen and hydrogen or in the preparation of alcohol. A large number of steps which require different, highly developed catalysts are utilized in the industrial production of hydrogen. A series of reactions is, for example, typically needed to bring the concentration of CO below the required threshold values, e.g. 50 ppm. Many of these steps require high pressures (e.g. above 70 bar), high reaction temperatures (sometimes above 800° C.) and utilize spontaneously heating, pyrophoric catalysts. The dimensions and weight of the plants required in order to be able to carry out such processes safely are much too large for many fuel cell applications, e.g. in automobiles and in stationary domestic units. While the risks associated with these conditions can be mastered successfully in the environment of an industrial production site, they are not acceptable for most fuel cell applications.

The water gas shift reaction (WGS reaction) is a well-known catalytic reaction which is used for, apart from further applications, the production of hydrogen in a gas stream by chemical reaction of CO with water vapor and proceeds according to the following stoichiometry:

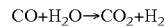

$$CO + H_2O \rightarrow CO_2 + H_2$$

The reaction requires a catalyst to proceed. Typical catalysts for this reaction are based on combinations of iron oxide with chromium oxide (at high temperatures of about 350° C.) or mixtures of copper and zinc materials (at low temperatures of about 250° C.). If the WGS is operated at temperatures below 300°, this is referred to as low-temperature conversion (LTC).

The water gas shift catalysts (WGS catalysts) which are utilized commercially at present display a series of disadvantages for fuel cell applications. Many commercial WGS catalysts are self-heating and pyrophoric when they are exposed to atmospheric oxygen. Commercial high-temperature WGS catalysts based on iron-chromium in the reduced state reach temperatures of about 400° C. when they are exposed to atmospheric conditions. A similar picture is displayed by commercial copper-zinc-based low-temperature WGS catalysts in the reduced state; these reach temperatures of up to 750° C. on contact with atmospheric oxygen. The contact of air with WGS catalysts comprising copper oxide in the reduced state on cerium oxide leads to a temperature increase by about 500-600° C., and platinum-cerium oxide WGS catalysts experience similar temperature increases of about 400° C. In many cases, such a rapid and considerable temperature increase leads to sintering of the catalyst, which can lead to paramount destruction of the catalyst. Such a temperature increase can also lead to the reduced catalyst igniting spontaneously in air.

While the materials mentioned are suitable for use in industrial synthesis since the reaction conditions can be monitored accurately here and appropriate safety measures are taken in order to prevent contact with air, such catalysts represent a substantial risk when they are to be installed in fuel cell applications such as automobiles or stationary domestic applications.

Since many materials used in the catalysts are also very expensive, there is likewise a search for catalysts which are cheaper but have the same or improved activity.

WGS catalysts have been intensively researched. A review is given by Jaques Barbier and Daniel Duprez, Applied Catalysis B: Environmental 4 (1994)105 to 140 "Steam effects in three way catalysts", in which a series of catalytic systems including systems supported on aluminum oxide, cerium oxide promoters and a series of noble metal systems comprising platinum (Pt), rhodium (Rh) and palladium (Pd) are discussed in detail.

WO 02/26619 A2 describes a catalyst having a low pyrophoricity for the WGS reaction, which preferably comprises Cu as active composition on alumina with an addition of cerium oxide and chromium oxide, with the support material being impregnated with the active components. Chromium oxides are carcinogenic and are thus likewise undesirable additions to catalysts since they make handling much more difficult for the customer.

Pyrophoric catalysts have a distinct disadvantage. Long procedures which have to be followed precisely are necessary to carry out activation and passivation so that the catalyst is stable in air. In addition, special equipment is required for these procedures, for example flow meters. Owing to the exothermic nature of the reduction of a copper catalyst, activation of a usually pyrophoric low-temperature conversion (LTC) catalyst based on copper requires intensive monitoring both of the temperature and of the metered addition of the reducing gas (usually hydrogen) which is effected via a carrier gas (normally nitrogen or natural gas). In a typical activation procedure, a small amount of hydrogen in a carrier gas is passed over the catalyst at low temperatures. The temperature of the catalyst bed is then slowly increased to an intermediate temperature. When this has been reached, the concentration of hydrogen in the carrier gas is gradually increased. These iterative steps are continued until the catalyst bed has been completely reduced. Suitable precautions have to be taken to keep the temperature below 230° C., since the copper catalyst begins to sinter above this temperature threshold. In an analogous way, suitable controls and procedures have to be utilized in order to remove a used pyrophoric catalyst from the reactor safely, since oxidation of the copper-comprising material once again takes place in an exothermic reaction. The catalyst requires a passivation step in order to be able to be removed from the reactor safely. In a typical passivation procedure, air is slowly metered into an inert carrier gas (usually nitrogen) so as to increase the concentration of oxygen gradually. The slow, stepwise increase in the concentration of air requires special flow meters and monitoring facilities (Catalyst Handbook Second Edition; Twigg, M. V., Ed.; Wolfe Publishing, 1989). The procedures and the associated equipment for activation and passivation of the material contribute to the utilization problems and the costs of pyrophoric LTC catalysts.

In Journal of Power Sources 118 (2003) 61 to 65, Engelhard Corporation, represented by W. Ruettinger, O. Ilinich and R. J. Farrauto, describes a Selektra Shift catalyst which is said to provide a nonpyrophoric alternative to the conventional Cu—ZnO catalysts. At the low GHSV of 2500 $h^{-1}$ and a gas composition of 8% of CO, 10% of $CO_2$, 43% of $H_2$, 26% of $H_2O$, this catalyst achieves equilibrium in the shift reaction at 220° C. As FIG. 4 of the publication shows, the catalyst is deactivated slightly on contact with air. FIG. 5, which is intended to show the stability of the catalyst toward condensate water, likewise indicates deactivation. A corresponding process is disclosed in WO 02/26619.

In "Oxidative steam reforming of methanol over CuZnAl (Zr)-oxide catalysts, a new and efficient method for the production of CO-free hydrogen for fuel cells", Chem. Commun. (1999), 2341-2342, S. Velu et al. describe a Cu/Zn/Al/(Zr)-comprising catalyst which, with addition of oxygen, displays a high stability and catalytic activity in methanol reforming.

A WGS catalyst having a significantly lower heat evolution on contact with atmospheric oxygen, having lower production costs, having an at least comparable catalytic activity compared to existing systems, having a stable performance on contact with atmospheric oxygen or in the case of condensation of water on the catalyst and having a form which is stable, durable and practical for use in fuel cell applications was sought. In particular, the catalyst has to survive typical start-up and shutdown processes (condensation of water on the catalyst or shutdown by passing air over it, i.e. change of atmosphere) well.

It was therefore an object of the invention to provide such a WGS catalyst.

According to the invention, this object has been achieved by the catalyst comprising a mixed oxide comprising at least copper oxide, zinc oxide and aluminum oxide, with the catalyst precursor being present essentially as hydrotalcite and the copper oxide content being not more than 20% by weight.

The invention accordingly provides a chromium-free catalyst for the low-temperature conversion of carbon monoxide and water into hydrogen and carbon dioxide, which comprises a mixed oxide comprising at least copper oxide, zinc oxide and aluminum oxide, with the catalyst precursor being present essentially as hydrotalcite. The copper oxide content is not more than 20% by weight.

The invention further provides a process for producing such a catalyst and a process for the low-temperature conversion of carbon monoxide and water into carbon dioxide and hydrogen.

Although copper-comprising catalysts used in the equilibrium reaction $CO+H_2O \rightarrow CO_2+H_2$ in the region of relatively low temperatures of from about 200 to 300° C. are usually pyrophoric in their activated state because of the high proportion of reduced metallic copper, it has surprisingly been found that reducing the proportion of copper makes it possible to prepare catalysts which even in the reduced state do not have to be labeled as pyrophoric and nevertheless have the necessary activity. Furthermore, it has surprisingly been found that the catalyst of the invention suffers no decrease in activity under the conditions of typical start-up and shutdown processes, in particular in the case of a change of atmosphere and condensation of water vapor.

The catalyst of the invention comprises a mixed oxide comprising at least CuO, ZnO and $Al_2O_3$, particularly preferably at least CuO, ZnO, $Al_2O_3$ and $ZrO_2$.

The structural basis of these catalysts is hydrotalcite. A hydrotalcite is a synthetic anionic clay having brucite-like layers having the approximate composition:

$M^{II}_6 M^{III}_2 (OH)_{16} CO_3 \cdot 4H_2O$, where $M^{II}$ is at least one divalent metal ion and $M^{III}$ is at least one trivalent metal ion.

According to the invention, $M^{II}$ is copper and zinc, but it is also possible for other divalent metal cations, for example Fe, Co, Mg, Ca, Mn, Ni, Sr, Ba, preferably Mg, Ca, Sr, Ba or Ni, to be additionally comprised.

According to the invention, $M^{III}$ is aluminum, but it is also possible for other trivalent metal cations, for example ones selected from the group consisting of the lanthanides, La, Sc, Y, Ga, In and Fe, preferably elements selected from the group consisting of the lanthanides, La, Sc and Y, to be additionally comprised.

In the catalyst of the invention, the elements mentioned are, after calcination of the catalyst precursor, present as oxides in the following ratios:

CuO: from 2 to 20% by weight, preferably from 4 to 15% by weight, particularly preferably from 6 to 12% by weight;

ZnO: from 40 to 80.5% by weight, preferably from 50 to 77% by weight, particularly preferably from 60 to 75% by weight;

$Al_2O_3$: from 17.5 to 45% by weight, preferably from 17.5 to 35% by weight, particularly preferably from 17.5 to 25% by weight.

To obtain the hydrotalcite structure type, a proportion of $Al_2O_3$ of at least 17.5% by weight has to be present in the catalyst.

Further details of this subject are given in F. Trifiró et al., Preparation and Properties of Copper Synthetic Clays, in: Characterization of Porous Solids, editor.: K. K. Unger et al. (1988), page 571 ff.

The mixed oxide advantageously further comprises zirconium oxide in an amount of from 0 to 10% by weight, preferably from 1 to 7% by weight, particularly preferably from 2 to 5% by weight.

The $ZrO_2$ ensures that the layer structure is "broken up" so that the individual active sites are more readily accessible in order to function catalytically. To achieve this advantageous effect, amounts of $ZrO_2$ of, for example, about 2.5% by weight are used in particular embodiments.

Possible additions of $TiO_2$, $SiO_2$ and/or $MnO_2$, which likewise have a high affinity for CO, also perform the same task.

Apart from the advantageous oxides according to the invention, the mixed oxide can comprise further oxides, for example alkaline earth metal oxides. If such further oxides are comprised in the mixed oxide, they are present in an amount of not more than 25% by weight, preferably not more than 10% by weight.

The catalyst of the invention can comprise not only the above-described mixed oxide but naturally also small amounts of further compounds which occur, for example, as normal impurities.

The catalyst of the invention is chromium-free.

It advantageously does not comprise any noble metal. In the temperature range mentioned, noble metals display a satisfactory activity in respect of the shift reaction only at very high and thus uneconomical concentrations.

The precursor of the catalyst of the invention is, according to the invention, present essentially as hydrotalcite. However, other structures such as aluminum oxides or the like can occur in addition. For the purposes of the present invention, "essentially" means at least 80% by weight, advantageously at least 90% by weight, particularly preferably at least 95% by weight.

The hydrotalcite structure is confirmed by XRD.

The catalyst of the invention for the low-temperature conversion of carbon monoxide and water into hydrogen and carbon dioxide can be produced by precipitation of precursor substances.

Starting materials used are copper, zinc and aluminum and also, if appropriate, further elements as described above.

The aluminum content can be provided in various structural variants, for example as boehmite or alumina sol. Possible starting materials for the other metals are their salts in the form of nitrates, chlorides, carbonates, acetates or sulfates. Particular preference is given to using the nitrates, carbonates and acetates of the metal cations.

According to the invention, the precipitated phase is essentially a hydrotalcite. To obtain this structure, attention has to be paid, in particular, to the maintenance of pH value and temperature.

The precipitation is advantageously carried out in a basic medium. Preference is given to using a mixed solution of sodium carbonate and NaOH, particularly preferably a mixed solution of 2 molar NaOH and 0.3 molar sodium carbonate solution, for this purpose. However, the precipitation can also be effected by means of other basic solutions. It preferably proceeds at a pH of greater than 7.2, particularly preferably at a pH of greater than 7.5.

The precipitation is advantageously carried out at a temperature of from 10 to 80° C., preferably from 15 to 50° C., particularly preferably from 20 to 40° C.

After the precipitation, the catalyst is, in the usual manner, washed, dried, possibly also calcined and tableted together with graphite or another lubricant. Tableting can be followed by a further calcination.

The catalyst produced according to the invention is not pyrophoric. The pyrophoricity of a material is determined in accordance with the EC guideline 92/69/EEC, appendix A. 13. A further possible test is the "test for spontaneous ignition" using the test method of Grewer (VDI 2263, leaflet 1, chapter 1.4.1), in which the temperature increase of a sample having a volume of 10 ml on bringing the sample into contact with atmospheric oxygen is observed. A further possible test is the "wire basket method" which serves to classify the spontaneous ignition behavior for transport purposes (GGVS/ADR appendix A, UN Recommendations on the Transport of Dangerous Goods, Model Regulations, sections 2.4.3.2f and Manual of Tests and Criteria, section 33.3).

The catalyst of the invention has no pyrophoricity according to the three tests mentioned above.

To quantify the thermal behavior of catalysts, the following test method was employed:

The catalysts are milled and reduced in a hydrogen/argon atmosphere at 350° C. They are then exposed to a gas stream comprising 10% of $O_2$ at 250° C. for 2 hours. The DTA signal in the reoxidation is proportional to the heat evolved in the reaction and thus the pyrophoricity.

FIG. 1 shows the dependence of the evolution of heat on the Cu content of Cu catalysts obtained from the hydrotalcite precursor. The risk due to pyrophoricity on contact of air with the reduced catalysts is thus significantly reduced when it is used. The reduction in the risk makes the catalyst significantly simpler to handle, both in terms of its activation and its passivation.

The catalytic activity of the catalyst of the invention is comparable to existing systems. However, it is an advantage that the catalyst does not suffer a decrease in activity in the case of a change of atmosphere and condensation of water vapor. Since both steps are typical conditions on switching on or switching off a fuel cell system, it is important that a change of atmosphere or condensation of water vapor does not lead to a damaging decrease in activity.

The catalyst of the invention is stable, durable and can be produced economically. The risk of sintering of the active composition on contact with air is very low. It displays satisfactory hardness and lateral compressive strength even after use and condensation of water vapor.

The catalyst of the invention can be used in any form, for example as coating on a monolith, as shaped body in extrudate or pellet form or as powder. A mechanically stable form is preferred in order to avoid attrition and a dust formation.

The present invention meets all requirements for an improved WGS catalyst. The catalyst of the invention is therefore suitable for producing hydrogen from a gas stream and is practicable for use in fuel cell applications.

The process of the invention for the low-temperature conversion of carbon monoxide and water into carbon dioxide and hydrogen differs from conventional processes of the prior art in the use of a chromium-free catalyst comprising a mixed oxide comprising at least copper oxide, zinc oxide and aluminum oxide, with the catalyst precursor being present essentially as hydrotalcite and the copper oxide content being not more than 20% by weight.

Otherwise, the WGS reaction can be carried out under the customary conditions. It is advantageously carried out at temperatures of from 150 to 350° C., particularly preferably at temperatures of from 180 to 320° C. However, the catalyst is also suitable for use in WGS reactions which proceed at temperatures for which conventional LTC catalysts of the prior art can be used.

In an advantageous application, the process of the invention is carried out for producing hydrogen gas from a gas stream or a gas sample comprising CO and water. In other applications, the catalyst of the invention can be utilized in an intermediate step of a chemical process for generating hydrogen from a gas stream by means of the WGS reaction.

The invention leads to a WGS catalyst and a process for utilizing it, where the risk due to pyrophoricity on contact of air with reduced catalysts is significantly reduced.

The invention is illustrated in a nonrestrictive manner by the following examples:

EXAMPLES

For the purposes of the present invention, the terms indicated below are defined or explained as follows:

"Change of atmosphere": at the operating temperature, the operating gas ($CO$, $CO_2$, $H_2O$, $H_2$, $N_2$) is shut off and air is passed over the catalyst. After a few minutes, the operating gas is again passed over the catalyst.

"Condensation of water vapor": while the process is running, reactor inlet and outlet are closed. The reactor cools overnight. The water comprised in the operating gas condenses on the catalyst. After 12-16 hours, the reactor is started up again as usual using operating gas.

"DTA": "differential thermal analysis" is an analytical method for determining the heat emitted or absorbed (exothermil or endothermic) by a sample as a function of the temperature and/or the time.

"GHSV": the "gas hourly space velocity" is a measure of the gas flow of a reaction gas in liters per liter of catalyst and per hour at standard temperature and standard pressure.

"Lateral compressive strength", "LCS": the lateral compressive strength is a measure of the stability of a material when pressure is applied to its side faces. To measure this, the material is clamped between two punches (initial force: 0.5 N) which then move toward one another at a test speed of 1.6 mm/min and crush the material. The force required to crush the material is recorded. Data are obtained via statistical evaluation of at least 20 shaped bodies.

Example 1.1

Synthesis of a catalyst having the composition: 8% by weight of CuO, 72% by weight of ZnO, 17.5% by weight of $Al_2O_3$, 2.5% by weight of $ZrO_2$ 1.031 kg of Cu nitrate solution (19.4% strength), 9.983 kg of Zn nitrate solution (18.03% strength) and 5.388 kg of Al nitrate solution (8.12% strength) were mixed (solution) 1). 0.1462 kg of Zr carbonate was dissolved in 0.179 kg of $HNO_3$ (69.3% strength) (solution 2). Solution 3 was made up from 2 molar NaOH and 0.3 molar sodium carbonate solution. Solution 3 was initially charged, and solutions 1 and 2 were added in parallel.

The mixture was heated to 50° C. and stirred for another 1 hour. The pH at the end was 8.0.

The sample was subsequently filtered, washed, dried, heated at 550° C. for 4 hours and finally tableted after addition of graphite.

Example 1.2

Comparative Example (Analogous to WO 02/26619 A2)

Synthesis of a catalyst having the composition: 8% by weight of CuO, 15% by weight of $CeO_2$, 2% by weight of $Cr_2O_3$ on 75% by weight of $Al_2O_3$ As described in WO 02/26619 A2, example 2, $Al_2O_3$ spheres DD-442 were heated at 500° C. (surface area: 230 $m^2/g$). Solutions of cerium nitrate, chromium nitrate and copper nitrate were sprayed in succession onto the spheres and in each case calcined at 500° C. after impregnation.

Example 1.3

Comparative Example (Typical High-Copper Catalyst)

Synthesis of a catalyst having the composition: 49% by weight of CuO, 30% by weight of ZnO, 18.5% by weight of $Al_2O_3$, 2.5% by weight of $ZrO_2$ Nitrate solutions of Cu, Zn and Al were mixed in a ratio of the oxides (% by weight) of 49:30:18.5. In addition, zirconium carbonate was dissolved in concentrated nitric acid in a ratio of the oxides of 2.5% by weight. A mixed solution of sodium hydroxide and sodium carbonate was made up. The solutions were combined, stirred and the catalyst precursor was precipitated. The sample was subsequently filtered, washed, dried, heated at 550° C. for 4 hours and finally tableted in a manner analogous to example 1.1.

Example 1.4

Comparative Example (Low CuO Content on $Al_2O_3$)

Synthesis of a catalyst having the composition: 8% by weight of CuO, 14% by weight of $CeO_2$ on $Al_2O_3$ Sasol $Al_2O_3$ spheres were placed in a porcelain dish and cerium nitrate solution was added dropwise while stirring. The spheres were briefly stirred further after impregnation and immediately dried and calcined. In a second step analogous to the first, the spheres were coated with Cu nitrate solution. Drying was in each case carried out at 120° C. for 2 hours, and calcination was carried out at 550° C. in a muffle furnace.

Example 1.5

Comparative Example (Addition Of $Cr_2O_3$)

Synthesis of a catalyst having the composition: 8% by weight of CuO, 67% by weight of ZnO, 17.5% by weight of $Al_2O_3$, 2.5% by weight of $ZrO_2$, 5% by weight of $Cr_2O_3$ The procedure of example 1.1 was repeated with a Cr nitrate solution (in solution 1) being additionally added.

Example 1.6

Comparative Example (Without $Al_2O_3$)

Synthesis of a catalyst having the composition: 8% by weight of CuO, 89.5% by weight of ZnO, 2.5% by weight of $ZrO_2$ The procedure of example 1.1 was repeated with solution 1 consisting exclusively of the Zn nitrate solution.

Example 1.7

Comparative Example (Using $Ce_2O_3$ in Place of $Al_2O_3$)

Final composition: 10% of CuO, 50% of ZnO, 37.5% of $Ce_2O_3$, 2.5% of $ZrO_2$

The procedure of example 1.1 was repeated using a Ce nitrate solution in place of Al nitrate solution.

Example 1.8

Variation of the Composition

Synthesis of a catalyst having the composition: 8% by weight of CuO, 59.5% by weight of ZnO, 30% by weight of $Al_2O_3$ (of this 13% by weight as Versal), 2.5% by weight of $ZrO_2$ The procedure of example 1.1 was repeated with part of the aluminum oxide (13% by weight) being added as Versal.

Example 1.9

Variation of the Composition—Addition of $Fe_2O_3$

Synthesis of a catalyst having the composition: 8% by weight of CuO, 67% by weight of ZnO, 17.5% by weight of $Al_2O_3$, 2.5% by weight of $ZrO_2$, 5% by weight of $Fe_2O_3$ The procedure of example 1.1 was repeated with an Fe nitrate solution (in solution 1) being additionally added.

Example 1.10

Variation of the Composition

Synthesis of a catalyst having the composition: 8% by weight of CuO, 82% by weight of ZnO, 7.5% by weight of $Al_2O_3$, 2.5% by weight of $ZrO_2$ A method analogous to example 1.1 was employed.

Example 1.11

Variation of the Composition

Synthesis of a catalyst having the composition: 8% by weight of CuO, 74.5% by weight of ZnO, 15% by weight of $Al_2O_3$, 2.5% by weight of $ZrO_2$ A method analogous to example 1.1 was employed.

Example 1.12

Variation of the Composition

Synthesis of a catalyst having the composition: 6% by weight of CuO, 74% by weight of ZnO, 17.5% by weight of $Al_2O_3$, 2.5% by weight of $ZrO_2$ A method analogous to example 1.1 was employed.

Example 1.13

Variation of the Composition

Synthesis of a catalyst having the composition: 10% by weight of CuO, 70% by weight of ZnO, 17.5% by weight of $Al_2O_3$, 2.5% by weight of $ZrO_2$ A method analogous to example 1.1 was employed.

Example 1.14

Variation of the Composition

Synthesis of a catalyst having the composition: 12% by weight of CuO, 68% by weight of ZnO, 17.5% by weight of $Al_2O_3$, 2.5% by weight of $ZrO_2$ A method analogous to example 1.1 was employed.

FIG. 1 shows an examination of the heat evolved in the oxidation of Cu catalysts produced by the method given under example 1.1 but having different compositions and plotted as a function of the Cu content. At a CuO content in the precursor of less than 12% by weight the catalysts are in the nonpyrophoric region.

Example 2.1

The catalyst was introduced into a heatable reactor. The volume was adapted so that the same amount of active copper was always present in the reactor. The catalyst was reduced under hydrogen at elevated temperature.

A gas composition of 4% by volume of CO, 8% by volume of $CO_2$, 28% by volume of $N_2$, 30% by volume of $H_2$ and 30% by volume of $H_2O$ was passed over the catalyst at a GHSV of 7500 $h^{-1}$. A temperature ramp from 130 to 300° C. was applied and the temperature at which the catalyst achieves the equilibrium of the reaction was determined.

The results are shown in table 1.

Example 2.2

A number of changes of atmosphere over the catalyst were carried out at about 200° C. in the apparatus described in example 2.1. The percentage relates to the change in the CO concentration in the offgas. The −20% reported for the first catalyst accordingly mean that the CO concentration has been reduced by 20% as a result of the change of atmosphere compared to the value before the change of atmosphere. This in turn indicates that the catalyst has become significantly more active.

The results are shown in table 2.

Example 2.3

The condensation of water vapor on the catalyst was carried out in the apparatus described in example 2.1. The catalyst was subsequently brought to 130° C. again under reformate and the temperature ramp described in the example 2.1 was applied. The temperature at which the catalyst then achieves the equilibrium of the reaction was determined.

The results are shown in table 2.

Example 2.4

The experiment was carried out in a manner analogous to example 2.1, but at a GHSV of 5000 h$^{-1}$ and a gas composition of 8% by volume of CO, 10% by volume of $CO_2$, 43% by volume of $H_2$, 26% by volume of $H_2O$. The catalyst achieved the thermodynamic equilibrium at 220° C.

TABLE 1

| Catalyst | Achievement of equilibrium [° C.]<br>Description: example 2.1 |
|---|---|
| Example 1.1 | 230° C. |
| Example 1.2 | 240° C. |
| Example 1.3 | >300° C. |
| Example 1.4 | 250° C. |
| Example 1.5 | 260° C. |
| Example 1.6 | 280° C. |
| Example 1.7 | >300° C. |
| Example 1.8 | 245° C. |
| Example 1.9 | 235° C. |
| Example 1.10 | 240° C. |
| Example 1.11 | 235° C. |
| Example 1.12 | 260° C. |
| Example 1.13 | 220° C. |
| Example 1.14 | 215° C. |

TABLE 2

| Catalyst | Change caused by a change of atmosphere [%]<br>Description: example 2.2 | Achievement of equilibrium after condensation of water vapor [° C.]<br>Description: example 2.3 |
|---|---|---|
| Example 1.1 | −20% over 16 h[1] | 230° C.[1] |
| Example 1.2 | +/−0% over 16 h[1] | 240° C.[1] |
| Example 1.3 | +/−0% over 28 h[2] | >300° C.[2] |

[1]Mechanical hardness after removal from the reactor still good (lateral compressive strength >5 N).
[2]Mechanical hardness after removal from the reactor unsatisfactory (no longer measurable).

In experiments at a demanding low temperature of 220° C. (typical reaction temperature=250° C.) and a GHSV=5000 standard I of gas/I of cat·h, the catalyst according to the invention (hydrotalcite structure: 10% by weight of CuO) gave a CO conversion of about 99% of the thermodynamic equilibrium and is thus comparable to or slightly better than Cr-comprising catalyst of the prior art (reproduction of catalysts according to WO 02/26619). A Cr-free comparative catalyst displayed a significantly worse performance than the catalysts according to the invention.

FIG. 2 shows a typical measurement curve on catalyst 1.1.
FIG. 3 shows a change of atmosphere on catalyst 1.1.

Figure 1:
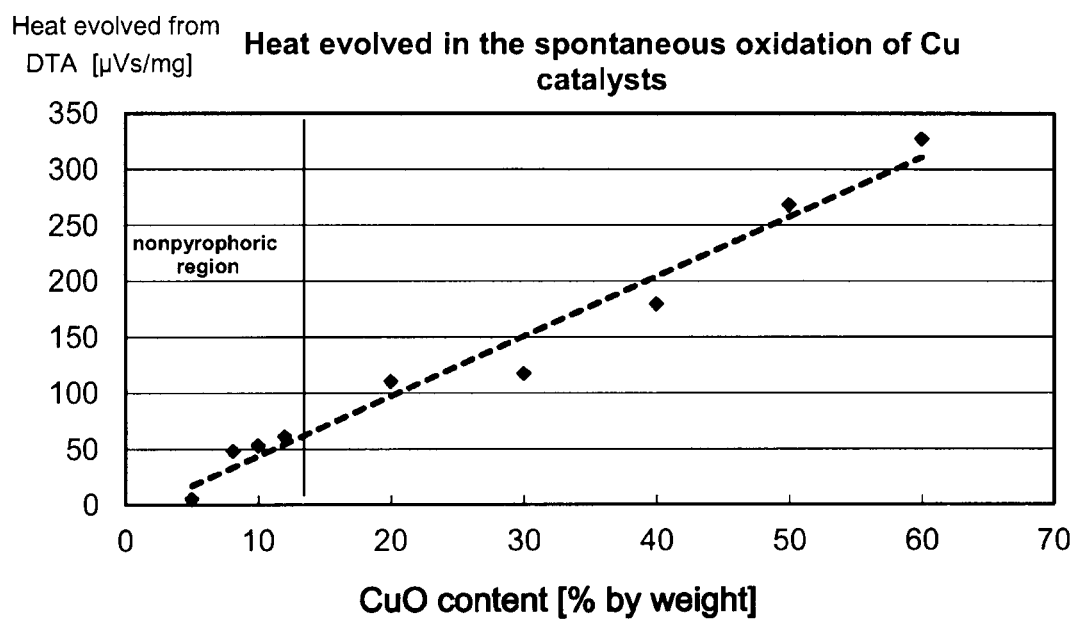
FIG. 1 shows an examination of the heat evolved in the oxidation of Cu catalysts produced by the method given under example 1.1 but having different compositions, plotted as a function of the Cu content. At a CuO content in the precursor of less than 12% by weight, the catalysts are in the nonpyrophoric region. DTA measurement signal μAV/mg for catalysts has different Cu contents. At 12% by weight of CuO in the catalyst precursor, the heat evolved is such that the material is classified as pyrophoric.
Figure 2:
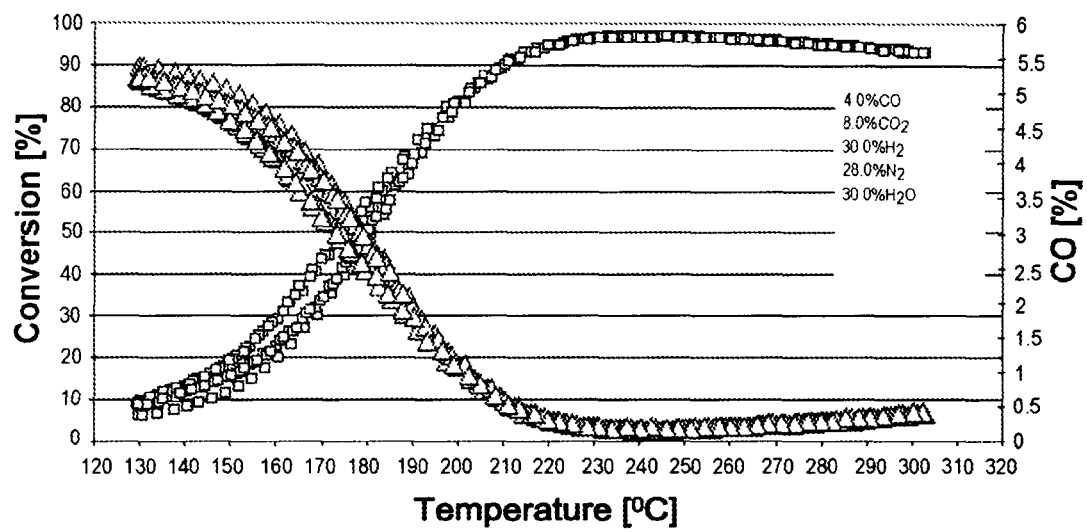
FIG. 2 shows a typical measurement curve on catalyst 1.1 The triangles denote the CO concentration. The squares denote the conversion in the reactor. At 230° C., the equilibrium of the reaction is achieved.
Figure 3:
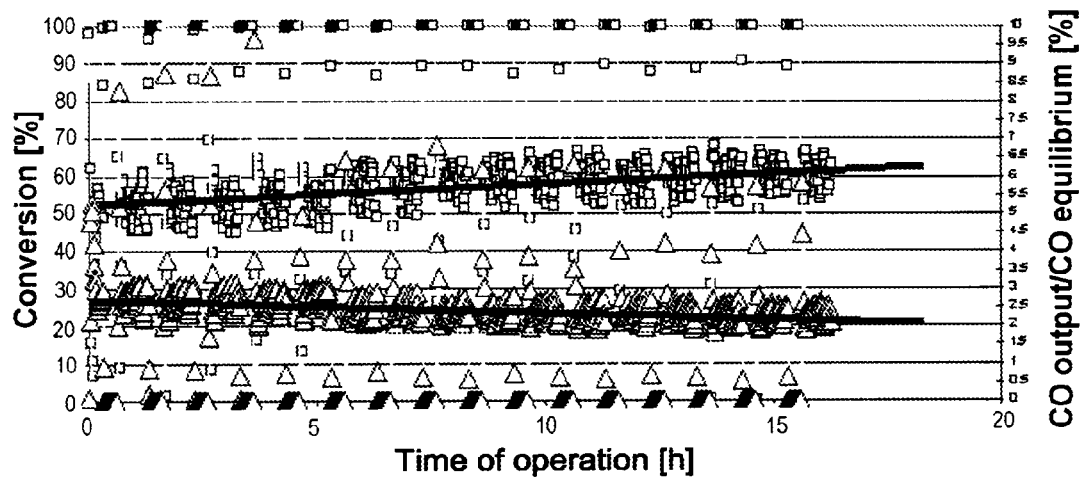
FIG. 3 shows a change of atmosphere on catalyst 1.1. The squares denote the conversion (a trend line is drawn in). The triangles denote the CO concentration at the outlet (a trend a line is drawn in).

The invention claimed is:

1. A chromium-free catalyst for the low-temperature conversion of carbon monoxide and water into hydrogen and carbon dioxide, which comprises a mixed oxide comprising at least copper oxide, zinc oxide and aluminum oxide, with the catalyst precursor being present as at least 80% hydrotalcite, the copper oxide content being from 6 to 12% by weight and the catalyst being non-pyrophoric.

2. The catalyst according to claim 1, wherein the mixed oxide further comprises at least zirconium oxide.

3. The catalyst according to claim 1, which does not comprise any noble metal.

4. The catalyst according to claim 1, wherein the mixed oxide comprises from 40 to 80.5% by weight of zinc oxide.

5. The catalyst according to claim 1, wherein the mixed oxide comprises up to 45% by weight of aluminum oxide.

6. The catalyst according to claim 1, wherein the mixed oxide comprises up to 10% by weight of zirconium oxide.

7. A process for the low-temperature conversion of carbon monoxide and water into carbon dioxide and hydrogen, wherein a chromium-free catalyst is used, comprising a mixed oxide comprising at least copper oxide, zinc oxide and aluminum oxide, with the copper oxide content being from 6 to 12% by weight, the catalyst precursor being present as at least 80% hydrotalcite and the catalyst being non-pyrophoric.

8. The process according to claim 7, wherein the low-temperature conversion is carried out at from 150 to 350° C.

9. The catalyst according to claim 1, wherein said catalyst precursor is present as at least 90% hydrotalcite.

10. The catalyst according to claim 1, wherein said catalyst precursor is present as at least 95% hydrotalcite.

11. The catalyst according to claim 1, wherein the mixed oxide comprises from 60 to 75% by weight of zinc oxide.

12. The catalyst according to claim 1, wherein the mixed oxide comprises from 17.5 to 45% by weight of aluminum oxide.

13. The catalyst according to claim 1, wherein the mixed oxide comprises from 17.5 to 25% by weight of aluminum oxide.

14. The catalyst according to claim 1, wherein the mixed oxide comprises from 1 to 7% by weight of zirconium oxide.

15. The catalyst according to claim 1, wherein the mixed oxide comprises from 2 to 5% by weight of zirconium oxide.

* * * * *